May 3, 1938.    G. DE BEESON    2,116,103
COMPASS FOR AUTOMATIC PILOTS
Filed Sept. 9, 1935    5 Sheets-Sheet 2

INVENTOR
GEORGE DE BEESON.
BY Lippincott & Metcalf
ATTORNEYS

May 3, 1938.  G. DE BEESON  2,116,103
COMPASS FOR AUTOMATIC PILOTS
Filed Sept. 9, 1935  5 Sheets-Sheet 3
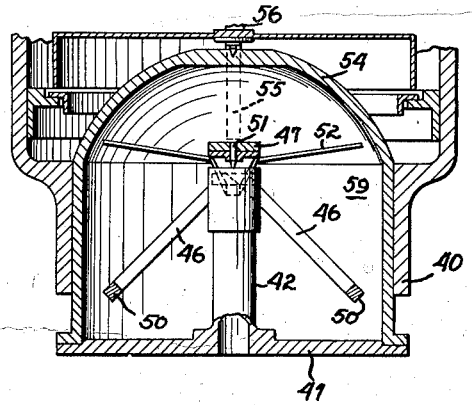
Fig. 4.
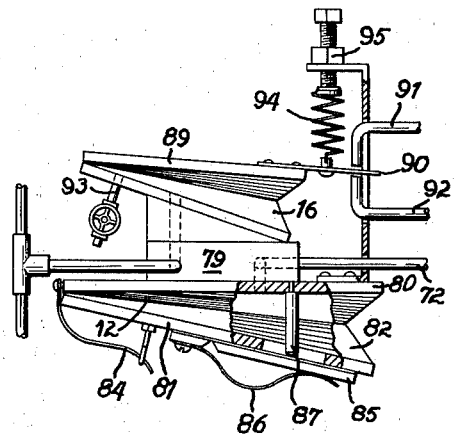
Fig. 5.
Fig. 7.
INVENTOR,
GEORGE DE BEESON.
BY
Lippincott & Metcalf
ATTORNEYS

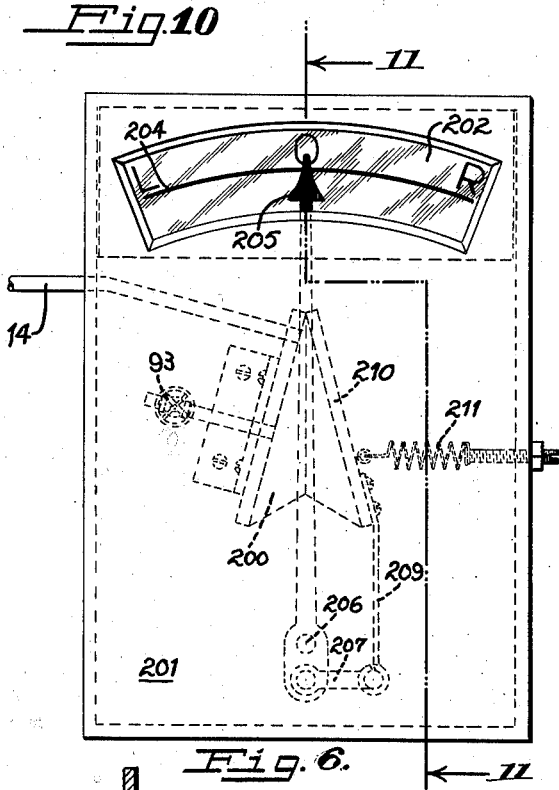
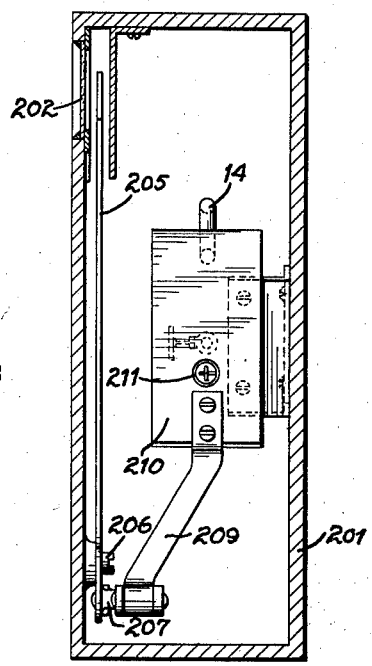
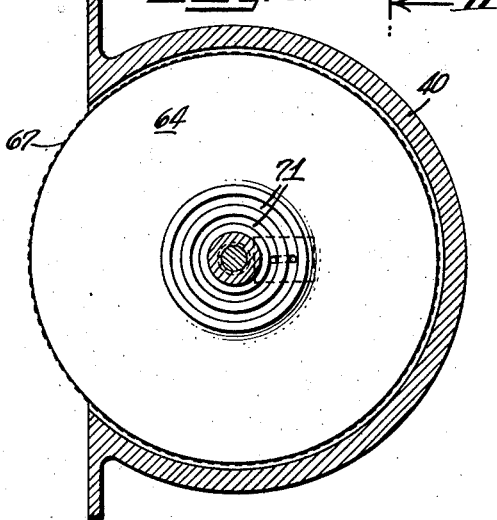
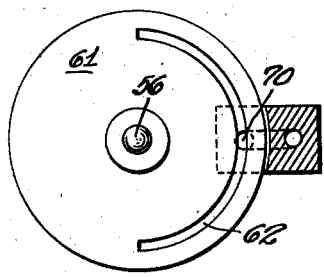

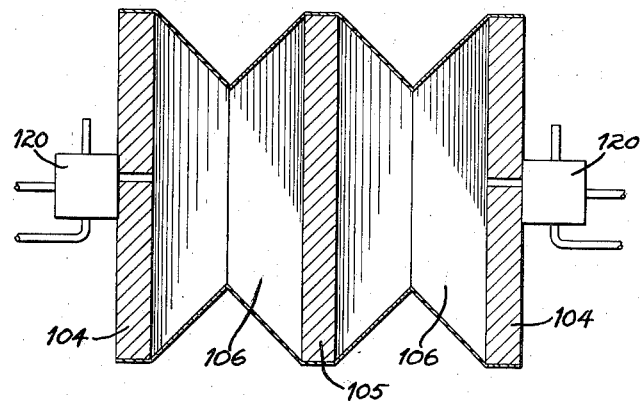
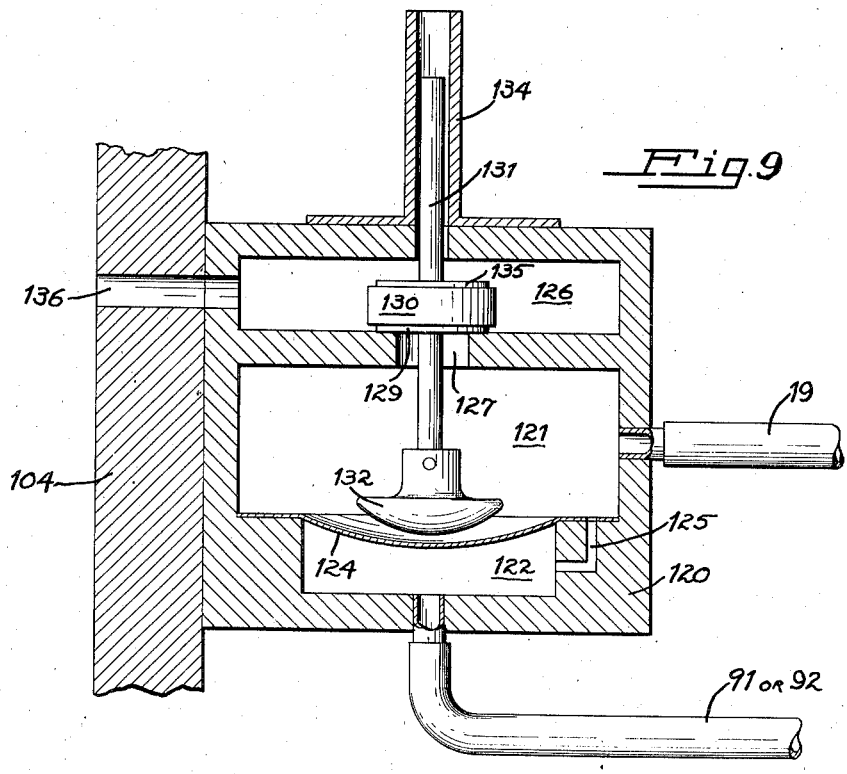

Patented May 3, 1938

2,116,103

UNITED STATES PATENT OFFICE 2,116,103

COMPASS FOR AUTOMATIC PILOTS

George De Beeson, San Francisco, Calif., assignor to R. Stanley Dollar, San Francisco, Calif.

Application September 9, 1935, Serial No. 39,761

4 Claims. (Cl. 33—222)

My invention relates to vehicles, and more especially to a means and method for automatically piloting a vehicle; and is particularly adapted for use as an automatic pilot for aircraft.

Among the objects of my invention are: To provide an automatic pilot operating on pneumatic principles; to provide an automatic pilot for aircraft or like vehicles, wherein directional control is obtained in addition to angular control of the craft with reference to the earth's plane; to provide an automatic pilot wherein the directional mechanism is controlled by an improved type of magnetic compass; to provide an automatic pilot mechanism particularly for use with aircraft wherein the magnetic directional control may be separated from the lateral and horizontal control for hand operation of direction, the lateral and horizontal control remaining in operation to control stability at all times; and to provide an automatic pilot mechanism which is simple, efficient, and of maximum reliability.

My invention possesses numerous other objects and features of advantage, some of which, together with the foregoing, will be set forth in the following description of specific apparatus embodying and utilizing my novel method. It is therefore to be understood that my method is applicable to other apparatus, and that I do not limit myself, in any way, to the apparatus of the present application, as I may adopt various other apparatus embodiments, utilizing the method, within the scope of the appended claims.

Referring to the drawings:

Figure 1 is a diagrammatic view, mostly in perspective, of an idealized aeroplane control system having the automatic pilot of my invention applied thereto in a preferred form. In this figure, no attempt has been made to show details of any individual sub-assembly, nor has any attempt been made to place the operational units in a position that they might occupy in an actual aircraft installation, the parts being separated for clarity of illustration. No switching arrangements are shown, as these may be varied in scope.

Figure 4 is a detailed view in section of the magnetic needle suspension of the compass on line 4—4 of Fig. 3.

Figure 5 is a view partly in section and partly in elevation of a pneumatic relay and air pressure control device on line 5—5, Fig. 3.

Figure 6 is a detailed section taken on line 6—6, Fig. 3.

Figure 7 is a top plan view of the rudder motor showing a preferred means of attaching the motor to the rudder bar.

Figure 8 is a sectional view of the rudder motor, taken as indicated by the line 8—8 in Figure 7.

Figure 9 is a sectional view of a control valve such as is used on all motors.

Figure 10 is a front view of a deviation indicating device attached to the compass.

Figure 11 is a view on line 11—11, Figure 10.

Figure 12 is a top plan view of the compass disc.

While I have described my device as being applied to an aeroplane, it should be distinctly understood that individual parts thereof, such as for example, the complete rudder control mechanism, can be applied to water ships, for example, with perfect success and the remaining equipment utilized for any purpose or on any craft where stability in either one or two planes is desired, and while the device is as a whole shown as being applied to an aircraft of the modern type, having hand control, it is likewise obvious that the hand control may be omitted and that the entire craft may be pilotless. In the term "hand control", I desire to include the use of foot-operated rudder bars and pedals, and either the stick type or wheel type of control mechanism.

Figure 1:
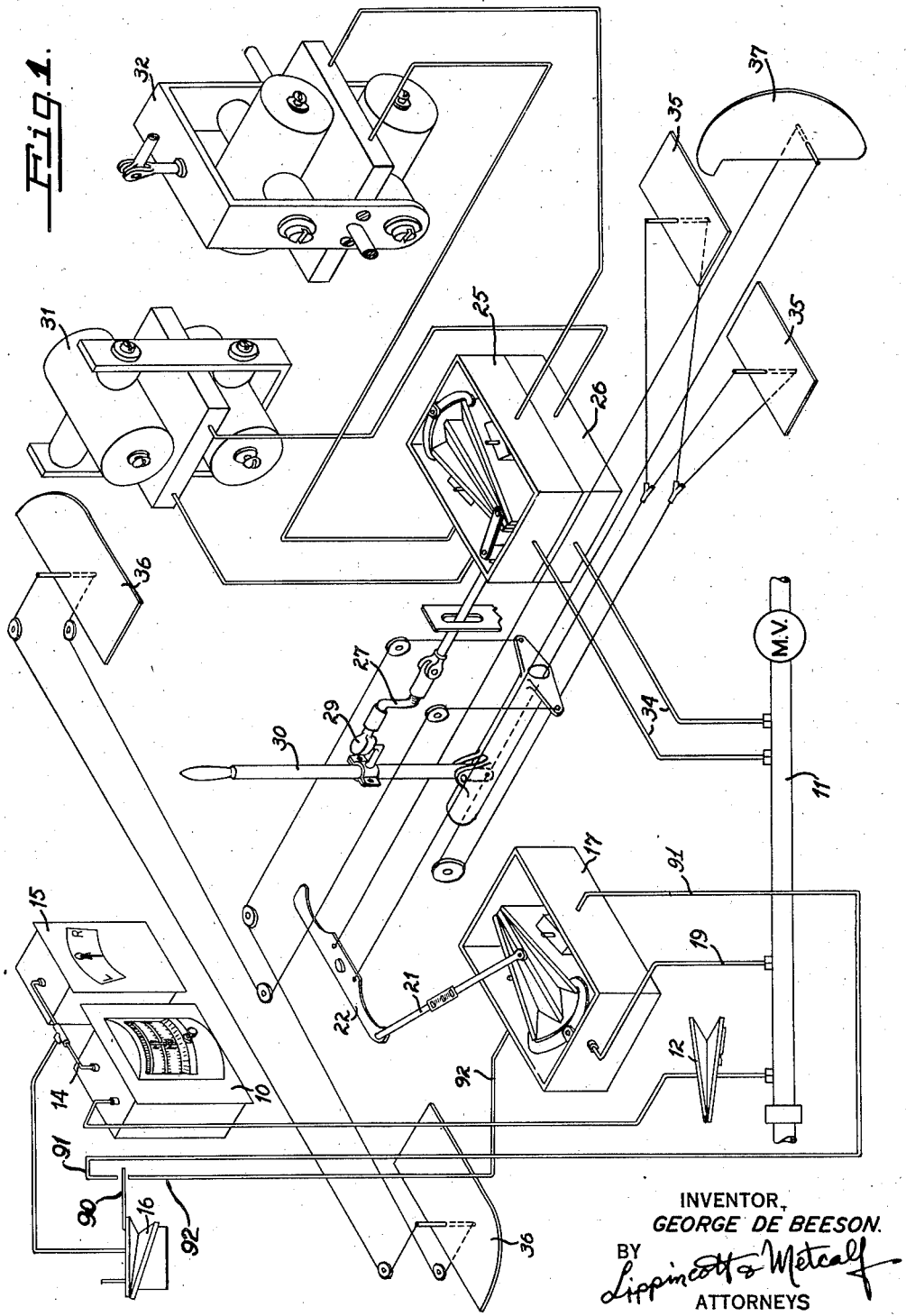

Before describing the individual units of my complete automatic pilot system in a preferred form, it is believed that the broad aspect of the invention may be more fully understood by reference to an idealized representation of the entire system as shown in Figure 1, and it will be described as a whole, the individual descriptions of the various units being deferred until later.

The directional control of the craft in geographical relationship to the earth is preferably obtained by the use of a special form of magnetic compass 10. This compass is provided with the usual type of magnetically controlled rotating dial upon which the directional insignias are inscribed, and it is also provided with a course dial which may be set by the operator, and which changes the angular position of certain valve ports. The dial driven by the magnetic needle carries a valve member which either allows air passage between the ports or obstructs the passage therebetween, thus causing a change in condition through the valve upon movement of the compass needle.

The main power supply for the entire actuation of the system may be any desired device for the production of a negative air pressure (hereinafter called vacuum for brevity) in a main vacuum line 11. I prefer to use a pressure of 5 inches of mercury. There are numerous devices for the production of such negative air pressures, various vacuum pumps, for example, or Venturi tubes may be utilized, or in fact, any other mechanism well known in the art. The production of such a negative air pressure is no part of the present invention.

The main vacuum passes through a pressure control bellows 12 and from thence to one of the compass ports. The outlet tube 14 from the compass ports divides and passes into a deviation indicator 15 which may be conveniently placed alongside the compass in view of the pilot, the other portion of the tube leading to a pneumatic relay 16. This pneumatic relay is so connected and balanced that when air is passing through the compass ports the bellows arm will move in one direction, and when the compass ports are occluded by movement of the compass needle, the bellows will move in the opposite direction.

A rudder motor 17 is provided with a direct connection 19 to the main vacuum line and also with a pair of rudder control lines 91 and 92, which terminate with open ends positioned to be closed or opened by movement of the pneumatic relay 16. The rudder motor 17 is really two motors, each one operable in opposite directions under the control of the pneumatic relays. The rudder connection 21 is made between the operating arm of the rudder motor and the rudder bar 22 of the aeroplane. Thus, the rudder will be moved in one direction or the other by the rudder motor in accordance with the setting of the pneumatic relays which in turn depends upon the movement of the compass needle. Further operational details will be given later.

For lateral stability, I prefer to utilize two separate motor assemblies similar to the rudder motor, a dual elevator motor 25 and a dual aileron motor 26, which are interconnected to an operating rod 27 which is mechanically connected through a mechanical interlock 29 to the stick or wheel 30 of the aircraft. While I have shown the stick mechanism in the preferred embodiment, the connection to a wheel driven plane is not complicated and will be described later.

The aileron and elevator motors are under the control of two stabilizing controls, an aileron control 31 and an elevator control 32. These controls each comprise two cylinders having rolling balls therein which change the center of gravity of the cylinders as the air craft deviates from a plane parallel to the earth, the balls rolling from one end to the other of the cylinders and operating valves which in turn control the response of their respective motors which are supplied with power from the main vacuum line through power supply conduits 34. The stick 30 is connected in the usual manner to elevators 35 and ailerons 36, and the rudder bar 22 is connected to the usual rudder 37. The detailed description of the compass will be given next.

Figure 2:
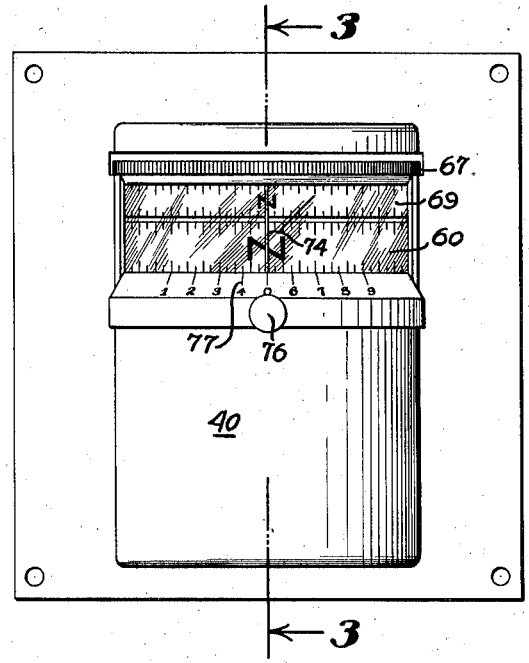
Figure 2 is a front face view of my preferred form of magnetic compass.
Figure 3:
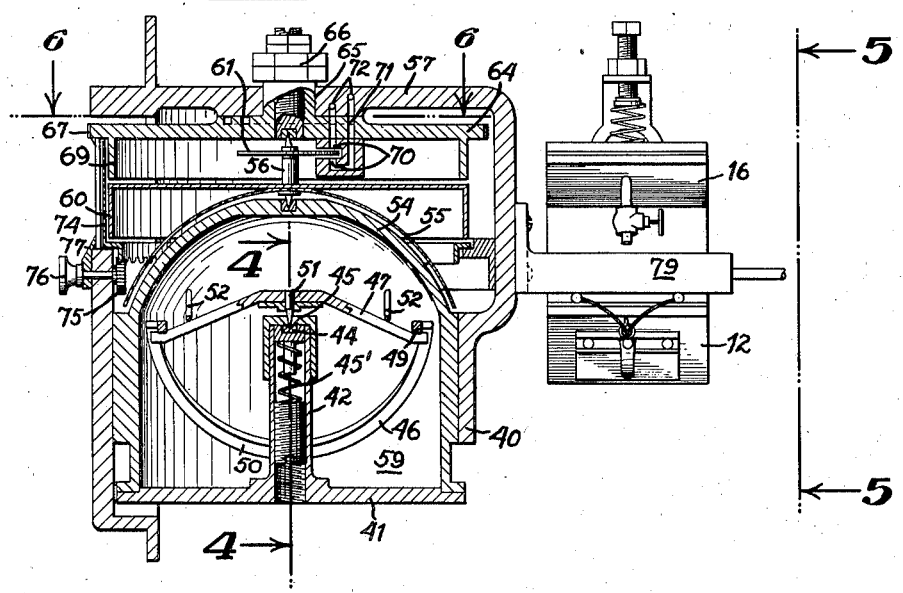
Figure 3 is a vertical sectional view, taken on line 3—3 Figure 2, together with associated control devices.

Referring to Figures 2, 3, 4 and 5, the compass as a whole is enclosed in a case 40, the front view of which is shown in Figure 2, the remaining figures being details of the mechanism thereof. Case 40 is provided with a bottom 41 upon which is mounted a raised pillar 42 provided at the upper end with a pivot bearing 44, this pivot bearing carrying a cone-shaped bearing surface 45. This bearing is mounted on a spring 45' in order to reduce landing shocks. Two compass needles 46—46 are mounted on a pivot bar 47 in such a manner that the ends 49 of the needles are adjacent. Each needle is preferably semicircular, with their curves 50 spread apart so that the compass needles pass from one end of the pivot bar to the other, one on each side of the central raised pillar 42. I prefer to position them at approximately right angles to each other, each needle therefore occupying a plane substantially 45° to the axis of the pillar. I prefer to bend the pivot bar in such a manner that it joins the ends of the compass needle and provide the bar with a central pivot 51, the end of which rests in the bearing 44; and for reasons to be supplied later I prefer to have the point of bearing contact on the same level as the ends of the compass needles. I also prefer to provide the pivot bar 47 with cross arms 52 which serve to prevent the compass assembly from falling out of its bearing when the plane is upside down, their ends contacting the case when in this position.

When the compass needles are mounted as above described, it can readily be seen that the compass assembly may dip and seek its own position, eliminating the necessity of gimbals. In addition, it may be seen also that the change in lateral angle of the craft does not, to any great extent, change the position of the ends 49, and therefore the directional indication given by the compass does not change to any great extent when the plane is being banked, within reasonable limits. Furthermore, in a proper bank, accompanied with the proper turning movement, centrifugal force will balance gravity to keep the needles centered, as in level flight. The fact, however, that a tilt can occur without changing the position of the ends 49 is important, as otherwise a false direction indication would be given under these circumstances. Thus the indication will be correct in any normal angular position of the craft, or needles.

Immediately over the compass needle assembly a hemispherical partition 54 is provided and is preferably somewhat larger, but concentric with the surface described by the ends of the compass needles while dipping, thus allowing such dip and turn to take place without the needle contacting the partition.

Above the partition is mounted a driven bar 55 of magnetic material, which is curved to correspond to the curve of the partition 54. This bar is rotatable on a double bearing pivot 56, one end of which engages the center of the hemispherical partition 54, the other end engaging valve assembly plate 64, later described. Thus, irrespective of the dip or angular position of the compass needle assembly within its own chamber 59, the driven bar will follow the line determined by the line through the ends of the compass needles.

I prefer to provide the driven bar with sufficient magnetic retentivity so that it will always be sufficiently magnetized that it cannot reverse itself with relation to the compass needle assembly and thus give a false reading 180° off. I may prefer, however, to make the driven bar itself of high permeability, and then firmly attach thereto, preferably near the pivot and parallel with the bar, a small strong magnet, preferably of cobalt steel. The high permeability bar insures maximum collection of flux lines from the compass assembly, thereby obtaining maximum power transfer, and the magnet prevents reversal.

Mounted also on the pivot 56 is a compass card 60 and an operating valve disc 61, this disc being shown in plan in Figure 12 and having a semi-circular apertured portion 62, the remaining portions of the disc being imperforate. While I have shown the perforation as being inside the periphery of the disc, it is quite obvious that it is within the scope of the instant invention that the apertured portion be cut away from the periphery of the disc instead of being cut in the disc inside the periphery.

Mounted on the top plate 57 is a valve assembly plate 64 which is pivoted to the top plate and rotatable thereon. The valve assembly is held in position by a bearing 65, the tightness thereof being adjustable by a tension nut 66. The valve assembly plate 64 is circular and has a knurled edge 67, which is exposed at the front of the compass case, this edge being used for manual rotation thereof. This assembly also carries a course card 69 which is cylindrical and positioned in a surface which is an extension of the surface of the compass card. The course card has direction insignia thereon corresponding to that on the compass card.

In addition to the course card, the valve assembly 64 carries a pair of opposed ports 70—70 having an open slot between them to receive the operating valve disc 61, and so positioned with relation to the disc that the disc may freely rotate between the ports without touching them, and also in such a position that during the rotation of the disc the apertured portion thereof will pass between the ports. The ports are connected outside the compass through a pair of distributing ring channels 71—71 (Figure 6) to inlet and outlet conduits 72—72; so that no matter how the valve assembly is rotated with relation to the compass case, connection is always made from the conduits to the ports.

I also prefer to provide my compass with an adjustable lubber line 74 extending across both the compass card and the course card. I prefer to make this lubber line adjustable by means of a ring gear assembly 75 which moves the lubber line around the compass card by engagement with stationary gear and operating knob 76, and I prefer to provide the moving lubber line with a stationary scale 77 in order that the number of degrees of magnetic declination may be set off. This movable lubber line is for the purpose of compensating for the magnetic declination in any given geographical location, as may be determined from the proper tables or magnetic maps.

I have therefore provided a compass assembly which will control the passage of air through a valve in accordance with the movement of the compass needle relative to the compass setting. It is of course to be understood that the disc 61 does not completely obstruct the two ports but is freely movable therebetween. However, when the imperforate portion of the disc is between the ports, sufficient obstruction is obtained to cause operation of the pneumatic relay about to be described.

The inlet conduit 72 of the compass is connected directly to the main vacuum line through the pressure control bellows 12. This bellows is shown in detail in Figure 5 and it is preferably mounted, together with the pneumatic relay 16, on a bracket 79 projecting from the compass case. This pressure regulator comprises a stationary side 80 and a hinged movable side 81 connected together by a regulator bellows 82, the bellows being held open by a regulator spring 84. If suction on the interior chamber of the bellows becomes too great, the movable side tends to approach the stationary side, causing a flap valve 85 to open against valve spring 86 by pressure exerted against pin 87. The opening of the flap valve causes air to be taken into the system, thus reducing the vacuum and causing the bellows under the urge of the spring 84 to return to its former position, the flap valve then closing. The arrangement gives a very steady pressure in the line leading to the compass.

The outlet from the compass is preferably dead-ended into the pneumatic relay 16, but is also dead-ended in a course indicator 15.

The pneumatic relay comprises a single bellows assembly 89, the movable side of which carries a relay arm 90 which passes between two open ended control conduits 91 and 92. The stationary side of the bellows is provided with an air leak 93 which may be adjustable so that when no suction is applied to the bellows through the compass valve, or at least only that amount of suction caused by the leakage around the disc, sufficient atmospheric air will enter the leak 93 to cause the relay arm to be held firmly against the terminus of one of the control conduits by relay spring 94 which is adjustable as to tension by tensioning adjustment 95. When the relay arm is so in contact with the terminus of the conduit, I prefer to so design the arm and the terminus that no atmospheric air can enter the conduit. To further this end, I may face the relay arm with the soft material such as leather, for example, so all leakage may be eliminated.

When, however, suction is applied to the interior of the bellows through the compass ports, the movable arm crosses the space between the open ends of the two conduits and contacts the opposite terminus, closing it in the same manner as has been above described for the other conduit. Thus, the entrance of air into the control conduits 91 and 92 will depend upon whether or not the control arm is completely covering either one of them, or whether the control arm is midway between the two.

I prefer to so adjust the tension of the relay spring 94 that when the apertured portion 62 of the operating valve disc 61 in the compass is between the opposed ports 70—70, thus allowing vacuum to be applied to the bellows assembly 89, that the relay arm will cover the terminus of conduit 92, but that when the imperforate portion of the discs is between the ports in the compass, the major portion of the vacuum is prevented from entering bellows 89 and it therefore opens under the influence of the spring and air leakage to close the terminus of conduit 91.

Furthermore, I prefer to so adjust the distance between the termini of conduits 91 and 92 so that when the edge of the aperture in the valve disc splits the port, just sufficient air will pass therethrough to balance leakage and to cause the relay arm 90 to ride midway between the termini, thus allowing access of air into both conduits 91 and 92. Thus, there will be three conditions available; first, where air is passing equally into both conduits 91 and 92; second, where air is prevented from entering 91 but enters 92 freely; and third, where no air may enter 92 but enters 91 freely. These latter two opposing conditions take place with any deviation of the disc aperture edge from its central point between the ports. Control conduits 91 and 92 lead directly to rudder control valves 120 which operate the rudder motor 17. This motor is shown in detail in Figures 7, 8 and 9.

The rudder motor assembly comprises a supporting frame 100 provided with a bearing boss 101 to which is hinged a rudder motor support 102, the ends of which are inturned and fastened securely to two stationary bellows walls 104—104. The two stationary walls converge at their far ends and each is there hinged to a central movable bellows wall 105 and the central wall is connected with each stationary wall by a flexible bellows 106, thus forming an air-tight chamber on each side of the movable wall. The entire motor is free to rotate on the bearing boss 101. A power take-off 107 is attached to the movable bellows wall 105 near the hinge, and rudder connection 21 hinged thereto connecting with the rudder bar 22 of the plane.

Mounted in this condition, free motion of the rudder bar may be obtained, the entire motor rotating freely on the bearing boss 101. It is also preferable that rudder attachment fitting 110 be a pin which drops into an aperture in the rudder bar in such a manner that it may be detached in case a mechanical disconnect is desired.

In order that the rudder motor operate to move the rudder when the former is energized, it is necessary to stabilize the convergent end of the rudder motor, and for this purpose I utilize a swinging lock arm 111 pivoted to an adjustable bearing 111' and maintained out of contact with the rudder motor by a lock spring 112. The swinging lock arm 111 is mechanically connected to a locking bellows 114 which is connected to the vacuum of the main vacuum line 11 through a control valve 114' which is provided with a release conduit 114" used in switching.

When vacuum is present in the locking bellows 114, it will tend to close and will pull the swinging lock arm 111 toward the end of the rudder motor and will cause a locking boss 115 on the end of the rudder motor to engage a locking recess 116 in the lock arm, thus stabilizing both ends of the rudder motor so that any motion of the movable bellows wall 105 will be applied to move the power takeoff and consequently the rudder. If the locking boss and the locking recess are not in line when vacuum is applied, the first centralization of the rudder will converge the two and interlock will take place.

As before stated, the rudder is under the control of vacuum conditions in rudder control conduits 91 and 92 which connect to rudder control valves 120. Each of these valves is alike and is constructed as shown in Figure 9. The main vacuum line 11 is connected through line 19 to a valve block 120 having a central chamber 121 separated from a control chamber 122 by a flexible diaphragm 124. Control chamber 122 is connected with the control lines 91 or 92 of the pneumatic relay. This valve has been previously described by me in my Patent No. 1,829,790, issued November 3, 1931.

The central chamber is connected to the control chamber by means of a small bleeder channel 125. An operating chamber 126 is provided immediately above the central chamber and connecting therewith by a valve port 127, normally closed by the lower face 129 of a valve 130 mounted on a valve stem 131, which extends through the port 127 in one direction to terminate in an enlarged end 132 adjacent the surface of the flexible diaphragm 124. This valve stem extends in the opposite direction through the valve block 120 into a valve guide 134 having therewith a loose fit so that atmospheric air may pass into operating chamber 126. The upper face 135 of the valve is arranged to close the entrance of this atmospheric air when the valve is raised, and at the same time operating port 136 connects the operating chamber 126 with the bellows chamber. Similar valves are used for both operating chambers of the rudder motor.

In operation, let us consider the condition which obtained when the control line 91 or 92 is closed to the atmosphere by means of the relay arm 90. Under these conditions the main vacuum holds the lower face 129 of the valve 130 tightly against port 127, preventing vacuum from entering the bellows. Through the bleeder channel 125, pressure on diaphragm 124 is equalized; consequently, there will be a negative pressure in control chamber 122 substantially equal to that in central chamber 121. When the terminus of control conduit 91 or 92 is opened by the relay, atmospheric air rushes into the conduit and into the control chamber 122, destroying the negative pressure therein and allowing the negative pressure in the central chamber 121 to pull the diaphragm therein and reverse the curve thereof, thus applying pressure to the enlarged end 132 and raising lower valve face 129 away from the port 127, thus allowing vacuum from the main vacuum line to work directly on the bellows, pulling the movable wall toward the stationary side and causing motion of the rudder bar in accordance with which valve is actuated. At the same time, entrance of air is closed. The valve will remain in this position as long as air enters the control conduit. When the control conduit is closed again, negative pressure in the central chamber will cause the control chamber to be evacuated through the bleeder channel, thereby allowing the valve to return to its first position, removing suction from the bellows and opening the bellows to atmospheric air.

Therefore, considering the rudder motor as a whole, it can be seen that when the relay arm 90 is between the two termini of the control conduits, and atmospheric air is entering both of them, no motion of the central wall will take place because both control valves will be in a position where vacuum is applied in equal amounts to both operating chambers. When, however, either one or the other of the control conduits is closed to the atmosphere, the valve corresponding to that conduit will operate to close off the vacuum on one side of the movable wall and allow entrance of atmospheric air. The wall will move, and operate the rudder toward the side having vacuum therein. Thus, the rudder will automatically apply correctional rudder movements in accordance with the deviation of the longitudinal axis of the ship from a predetermined course, as set by the course card 69 of the compass.

There are several other features which should be described in conjunction with the rudder motor. I have found that aeroplanes, for example, do not always control an equal amount in both directions for an equal amount of rudder movement in those directions. I therefore prefer to provide all my motors with stops 137—137 extending into the operating chambers which can be adjusted so that the swing of the central movable wall may be regulated in such a manner that if desired a large swing may be obtained in one direction but a smaller swing obtained in the other direction upon operation of the valves. In this manner, if an aeroplane controls more easily in one direction than the other, this peculiarity of the plane may be compensated for by regulating the motion of the rudder bar.

It will furthermore be noticed that in the type of control herein described the rudder motor always gives maximum stroke when energized. It has been found in operation of my system, or others, that when such a condition obtains, there is great danger of over-controlling, as the rudder will remain in the full corrective position right up to the time that the valve setting is changed by the longitudinal axis of the plane passing through the desired course line. This will cause reversal of the rudder motor and will tend to make the plane hunt across the course line. In order to minimize such hunting and to prevent such over-control as far as possible, I prefer to operate the rudder motor intermittently so that in correctional movement after an off course yaw, the rudder, instead of being applied steadily in corrective position, is applied intermittently.

This is accomplished by the use of an intermittent mechanism 139 comprising a swinging arm 140 operated from the main suction line 11 under control of the valve 141. The reciprocating mechanism utilized here is no part of the present invention and may well be the same type of oscillating apparatus as is used in windshield wipers and the like.

In any event, the swinging arm carries valve faces 142—142 which alternately close the open ends of intermittent conduits 144—144 connected directly to the control conduits 91 and 92. Thus, air is intermittently admitted to the control lines and even though the control lines are closed steadily at the relay, they are intermittently opened to the atmosphere adjacent the motor to cause intermittent action of the motor valves due to the regular, reciprocating action of the arm. Full stroke of the rudder is therefore applied intermittently when rudder action is called for by the compass action.

I have also found that it is possible to utilize this intermittent mechanism to adjust the action of the rudder motor to ships having different control characteristics. For example, in aircraft which respond sluggishly to their controls, I can adjust the intermittent mechanism to interrupt the action of the motors slowly; but in delicate craft which respond quickly to the controls, by speeding up the intermittent mechanism I am able to prevent, to a large extent, the over-control which would cause continuous hunting. Thus, my entire rudder setup is adapted to run in smooth air without any hunting whatsoever, and adapted to have a minimum hunt in rough air where deviations from course are frequent.

In many instances it is desirable to have a visual indication of course deviations, and I have therefore provided a course indicator such as shown in Figure 1 alongside the compass, and more in detail in Figures 10 and 11. The actuating unit of the course indicator is an indicator bellows 200, preferably identical with the bellows forming the compass relay 16; and the outlet conduit 14 of the compass is divided, one branch leading to the pneumatic relay, the other branch leading to the indicator bellows 200. The fixed wall of the indicator bellows is firmly attached to an indicator case 201 which is provided with a window 202 backed by a scale 204 upon which are inscribed a central zero and letters signifying "left" and "right". The indication is given by an indicator hand 205 mounted on a pivot 206 and extending beyond the pivot, there to be hinged to a link 207 attached to an actuating arm 209, attached to the movable wall 210 of the indicator bellows. The movable wall is moved to open position by spring 211. In this manner a large multiplication of motions is obtained at the end of the indicator hand which swings across the face of the scale making this bellows more sensitive than the pneumatic relay, thus giving an indication of the corrective impulses as they start. As the indicator bellows works faster than the remainder of the compass control system, it may be seen at all times just how the compass is about to control the craft.

Having thus described the mechanical features of my invention, I shall now discuss more in detail the operation of the device, beginning with the compass. Inasmuch as the angle of climb or glide does not tend to set up any swinging of the needle, the moments set up by turns or yaws are extremely small. The spring mounting of the needle assembly prevents damage from landing shock, and the upwardly extending fingers 52 prevent the needle assembly from being dislocated from its bearing when the plane is upside down.

As the driven bar 55 is either magnetized or magnetically biased, its position will be reversed as regards to its normal position in the earth's magnetic field, its south seeking pole positioning itself toward the north seeking pole of the main needle. Since the shape of the driven bar conforms quite accurately to the normal shape of the main needle field, the main needle may tilt on its pivot to a relatively large angle without losing control of the driven bar or changing its position. The normal periods of oscillation of the two magnetic structures are approximately the same, but if a swing is set up, as by a fast yaw, the oscillations of the two will be substantially 180° out of phase and this results in a periodic crossing of the fields, creating a strong damping action and quick return to alignment. In addition to this effect, eddy currents, set up in the partition 54, serve to damp the motions of both needles strongly, and the device may be used, if desired, without any liquid damping in the compass needle chamber. I prefer, however, to use an extremely light liquid having a low viscosity such as an alcohol in this chamber to provide a small amount of additional damping. This liquid, however, should not be heavy enough to cause swirl.

The operation of the compass valve has been discussed and it is believed to be clear that the course which it is desired to fly may be set on the course card by coordination with the lubber line, so that the rudder will be actuated to the end that the craft will assume in flying, an azimuth such that the readings of the live and dead cards will be identical. The movable lubber line may also be set to compensate for the magnetic declination.

I have found that in practice the compass controlled structure described will control the course of the craft within two degrees.

I claim:

1. A compass comprising a pair of curved magnets having their ends adjacent and their bends spaced, a support member joining opposite ends of said magnets, a pivot on said support member, an upright pivot support engaging the end of said pivot substantially in the plane of said ends, a casing supporting said pivot support, a substantially hemispherical cover over said magnet, said cover having a cross sectional curvature substantiallly concentric with the line of travel of said ends in a vertical plane, a magnetic bar member rotatable around a normally vertical axis coincident with the compass pivot bearing, said bar member having a curvature substantially concentric with the cross sectional curve of said cover thereby positioning the ends thereof normally adjacent said magnet ends, the cover material intervening, and indicating means operable by said bar member.

2. A compass comprising a pair of curved magnets having their ends adjacent and their bends spaced, a support member joining opposite ends of said magnets, a pivot on said support member, an upright pivot support engaging the end of said pivot substantially in the plane of said ends, a casing supporting said pivot support, a substantially hemispherical cover over said magnet, said cover having a cross sectional curvature substantially concentric with the line of travel of said ends in a vertical plane, a magnetic bar member rotatable around a normally vertical axis coincident with the compass pivot bearing, said bar member having a curvature substantially concentric with the cross sectional curve of said cover thereby positioning the ends thereof normally adjacent said magnet ends, the cover material intervening, a compass card rotated by said bar, and an adjacent separably rotatable course card.

3. In an automatic control system, a compass comprising a pair of curved magnets having their ends adjacent and their bends spaced, a support member joining opposite ends of said magnets, a pivot on said support member, an upright pivot support engaging the end of said pivot substantially in the plane of said ends, a casing supporting said pivot support, a substantially hemispherical cover over said magnet, said cover having a cross sectional curvature substantially concentric with the line of travel of said ends in a vertical plane, a magnetic bar member rotatable around a normally vertical axis coincident with the compass pivot bearing, said bar member having a curvature substantially concentric with the cross sectional curve of said cover thereby positioning the ends thereof normally adjacent said magnet ends, the cover material intervening, a pair of opposed ports, means for passing air from one of said ports to the other, a disc rotated by said bar member and extending between said ports, said disc being perforated to allow passage of air between said ports during 180° of rotation thereof and unperforated the remaining 180° to obstruct the passage of air therebetween, and control means responsive to the amount of air passing through said ports.

4. In an automatic control system, a compass comprising a pair of curved magnets having their ends adjacent and their bends spaced, a support member joining opposite ends of said magnets, a pivot on said support member, an upright pivot support engaging the end of said pivot substantially in the plane of said ends, a casing supporting said pivot support, a substantially hemispherical cover over said magnet, said cover having a cross sectional curvature substantially concentric with the line of travel of said ends in a vertical plane, a magnetic bar member rotatable around a normally vertical axis coincident with the compass pivot bearing, said bar member having a curvature substantially concentric with the cross sectional curve of said cover thereby positioning the ends thereof normally adjacent said magnet ends, the cover material intervening, a pair of opposed ports, means for passing air from one of said ports to the other, a disc rotated by said bar member and extending between said ports, said disc being perforated to allow passage of air between said ports during 180° of rotation thereof and unperforated the remaining 180° to obstruct the passage of air therebetween, control means responsive to the amount of air passing through said ports, and separate visual indicating means operated by the air passing through said ports.

GEORGE DE BEESON.